US011852308B2

(12) United States Patent
Lee

(10) Patent No.: US 11,852,308 B2
(45) Date of Patent: *Dec. 26, 2023

(54) LIGHTING SYSTEM FOR ATTACHMENT TO TUBULAR STRUCTURE

(71) Applicant: AG Lighting Innovations, LLC, Madison, TN (US)

(72) Inventor: Stanton T. Lee, Cottontown, TN (US)

(73) Assignee: AG Lighting Innovations, LLC, Madison, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,141

(22) Filed: Feb. 10, 2023

(65) Prior Publication Data

US 2023/0194058 A1    Jun. 22, 2023

Related U.S. Application Data

(63) Continuation-in-part of application No. PCT/US2022/030818, filed on May 25, 2022, which
(Continued)

(51) Int. Cl.
*F21S 4/20* (2016.01)
*F21V 19/00* (2006.01)
(Continued)

(52) U.S. Cl.
CPC ............... *F21S 4/20* (2016.01); *A01K 39/01* (2013.01); *A01K 45/00* (2013.01); *F21V 3/02* (2013.01);
(Continued)

(58) Field of Classification Search
CPC .. F21V 21/088; F21V 21/0885; F21V 21/008; F21V 23/002; F21V 31/005; F21S 4/20; A01K 39/01; A01K 45/00
See application file for complete search history.

(56) References Cited

U.S. PATENT DOCUMENTS

| 4,239,020 | A | 12/1980 | Kiyokawa et al. |
| 7,908,792 | B2 * | 3/2011 | Heighton ............. F21V 33/006 47/33 |

(Continued)

FOREIGN PATENT DOCUMENTS

DE    102020100779 B4    11/2021

OTHER PUBLICATIONS

International Search Report and Written Opinion for PCT/US2022/30818, dated Sep. 14, 2022. 8 pages).

*Primary Examiner* — William N Harris
(74) *Attorney, Agent, or Firm* — Luedeka Neely, P.C.

(57) ABSTRACT

A light fixture attached to an elongate tubular structure includes a baseplate having a pair of tabs extending from its opposing edges. A printed circuit board (PCB) attached to the baseplate has an aperture aligned with an aperture in the baseplate. An array of light emitting diodes (LEDs) are disposed on the PCB. A mounting bracket attached to the baseplate includes a strap and a pair of clips disposed at its opposite ends. Each clip engages one of the tabs to secure the mounting bracket to the baseplate. A pair of clamp arms extend from the strap and engage an arcuate central portion having a curvature that matches the curvature of the elongate tubular structure. An aperture passes through the strap that is aligned with the baseplate aperture. A power cable passes through the strap aperture, the baseplate aperture, and the PCB aperture. The power cable includes power wires that are electrically connected to the PCB for providing power to the LEDs. A protective cover protects the baseplate and the PCB, and provides for transmission of light from the LEDs.

20 Claims, 11 Drawing Sheets

Related U.S. Application Data is a continuation of application No. 17/329,474, filed on May 25, 2021, now Pat. No. 11,226,075.

(51) Int. Cl.
| | |
|---|---|
| *F21V 23/00* | (2015.01) |
| *F21V 3/02* | (2006.01) |
| *F21V 21/088* | (2006.01) |
| *A01K 39/01* | (2006.01) |
| *A01K 45/00* | (2006.01) |
| *F21V 31/00* | (2006.01) |
| *F21Y 115/10* | (2016.01) |
| *F21W 131/40* | (2006.01) |

(52) U.S. Cl.
CPC .......... *F21V 19/004* (2013.01); *F21V 21/088* (2013.01); *F21V 23/002* (2013.01); *F21V 31/005* (2013.01); *F21W 2131/40* (2013.01); *F21Y 2115/10* (2016.08)

(56) References Cited

U.S. PATENT DOCUMENTS

| | | | |
|---|---|---|---|
| 8,578,884 B2 * | 11/2013 | Hawk | ................... A01K 45/00 |
| | | | 362/253 |
| 9,945,544 B1 | 4/2018 | Lee et al. | |
| 2005/0151040 A1 | 7/2005 | Hsu | |
| 2007/0235608 A1 * | 10/2007 | Blye | .................. F21V 21/0885 |
| | | | 248/227.3 |
| 2007/0247858 A1 | 10/2007 | Ford | |
| 2009/0078209 A1 | 3/2009 | Kroeker | |
| 2010/0192865 A1 | 8/2010 | Hawk | |
| 2012/0218771 A1 | 8/2012 | Yen | |
| 2013/0016506 A1 | 1/2013 | Odom, Jr. | |
| 2014/0268710 A1 | 9/2014 | Murano et al. | |
| 2015/0251735 A1 | 9/2015 | O'Maley | |
| 2016/0135268 A1 | 5/2016 | Pearson et al. | |
| 2016/0305622 A1 | 10/2016 | Baker, Jr. | |
| 2018/0142873 A1 | 5/2018 | Morales et al. | |
| 2020/0208814 A1 * | 7/2020 | Li | ........................... F21V 19/02 |

\* cited by examiner

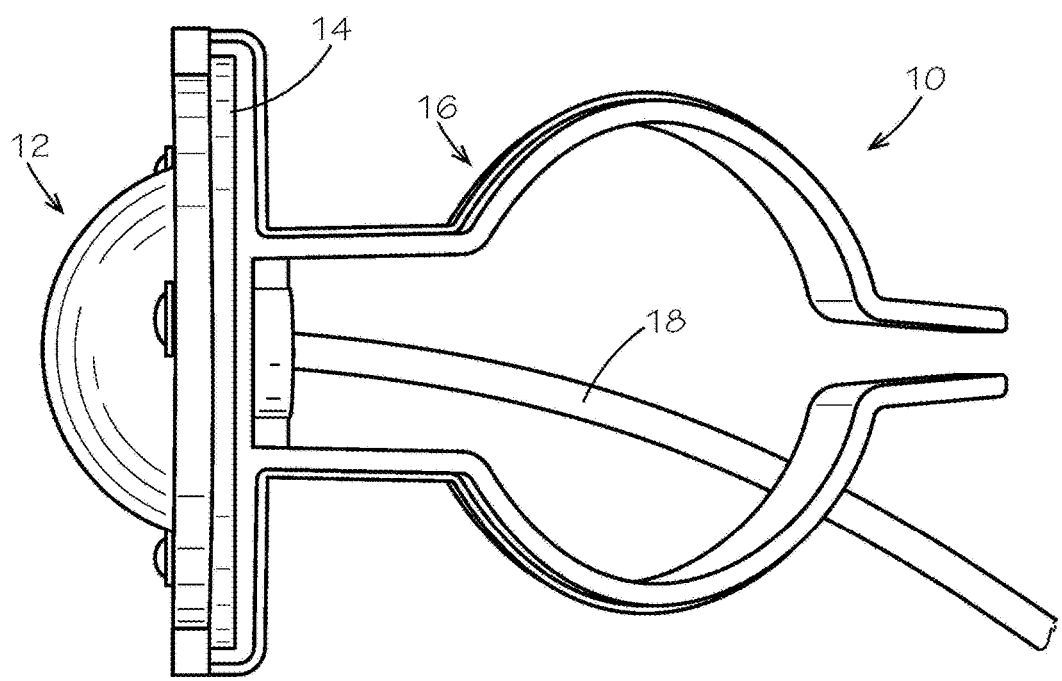
FIG. 1A
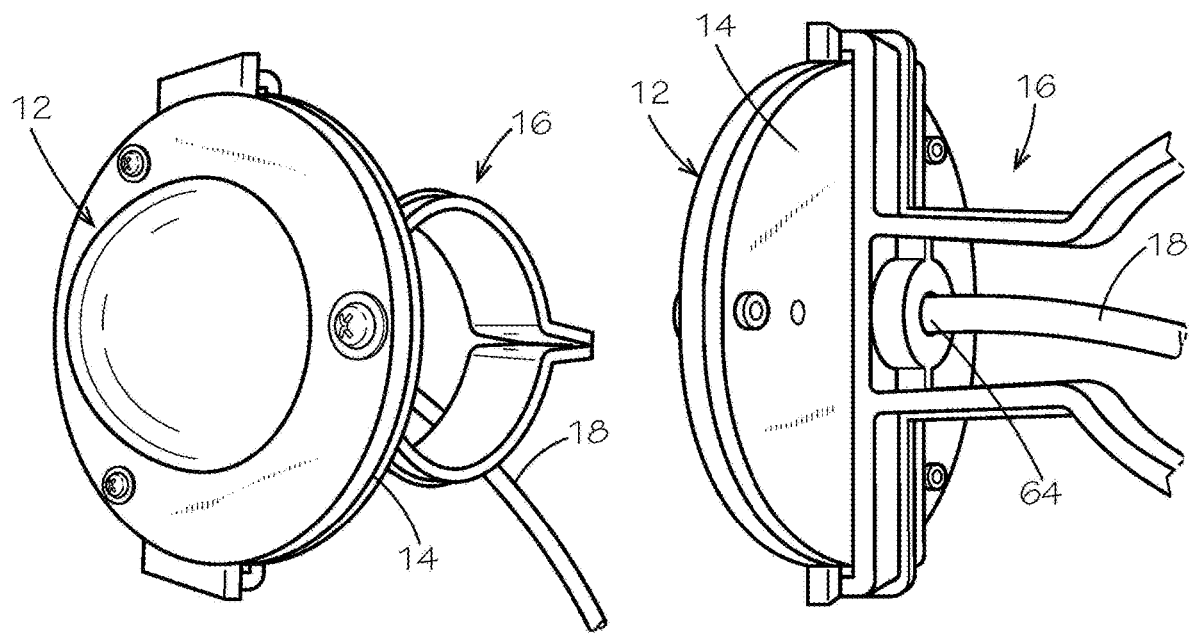
FIG. 1B  FIG. 1C

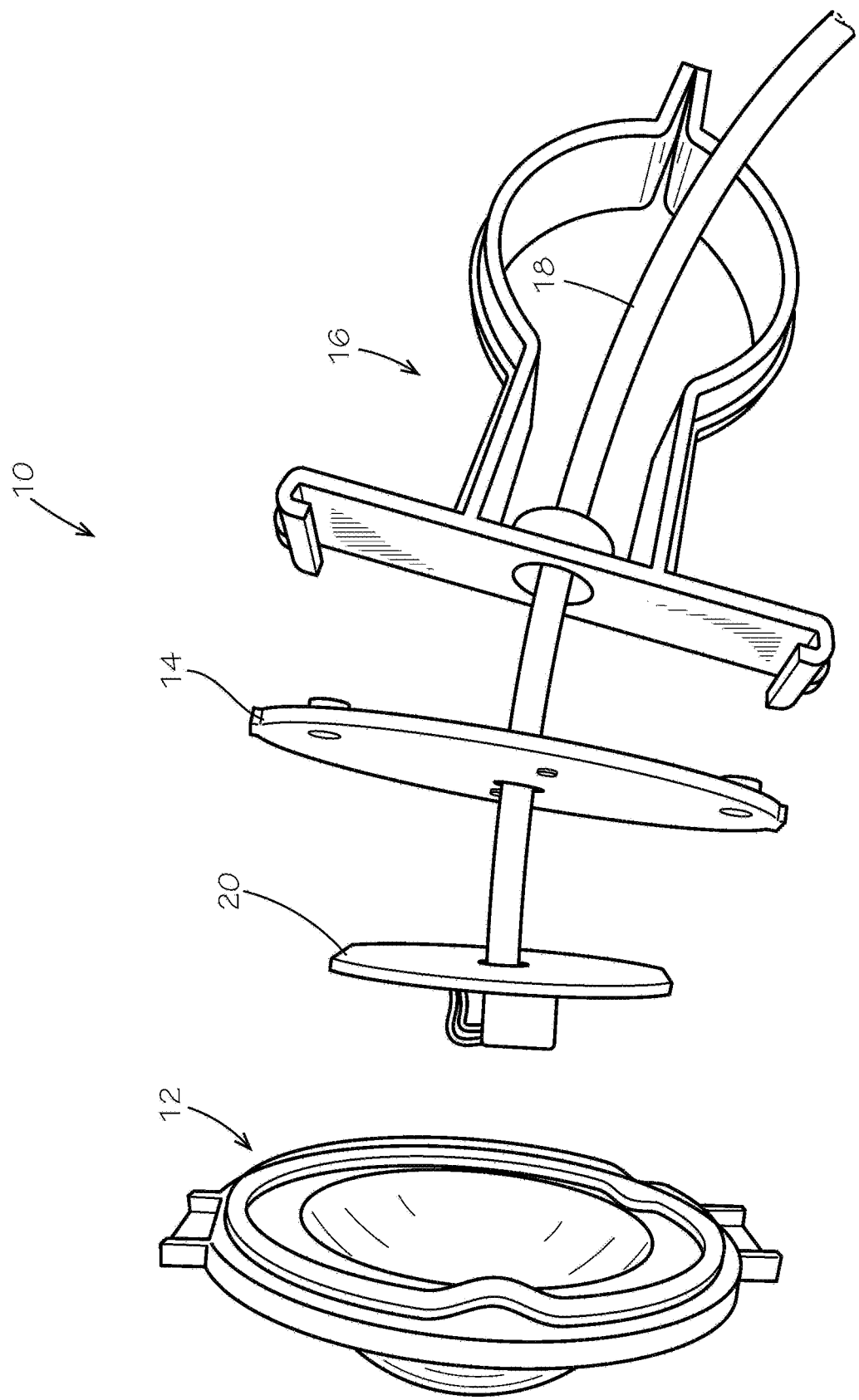

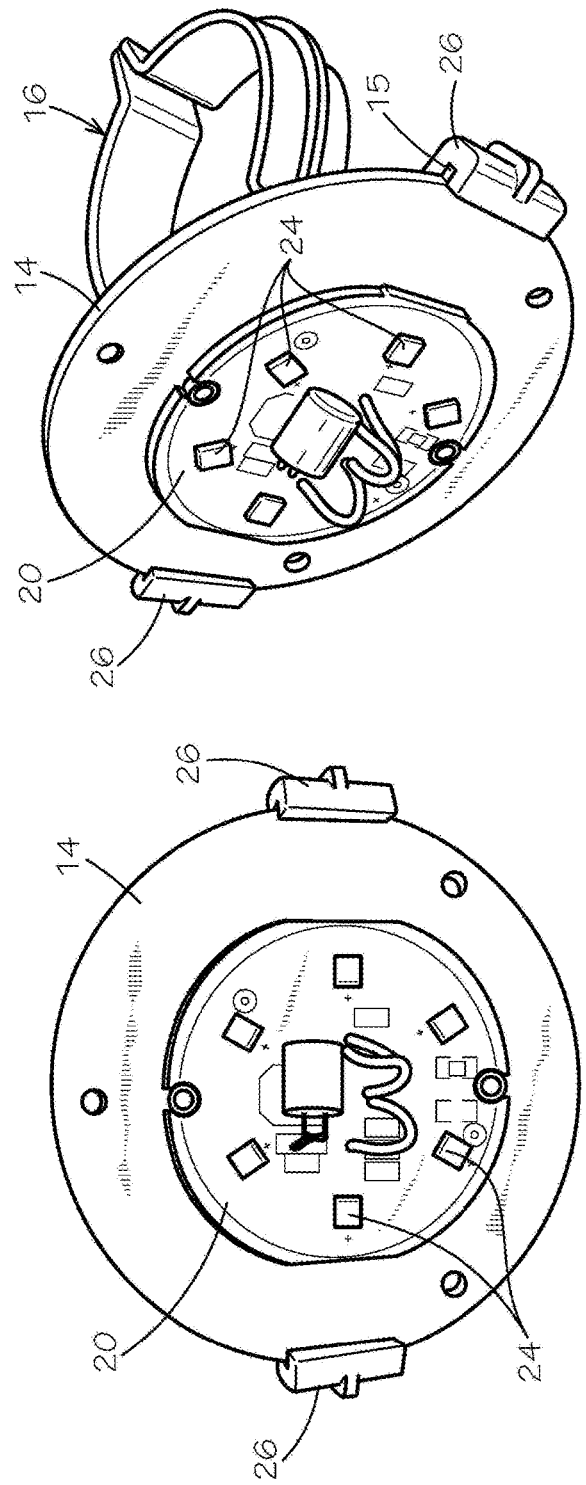
FIG. 3B
FIG. 3A
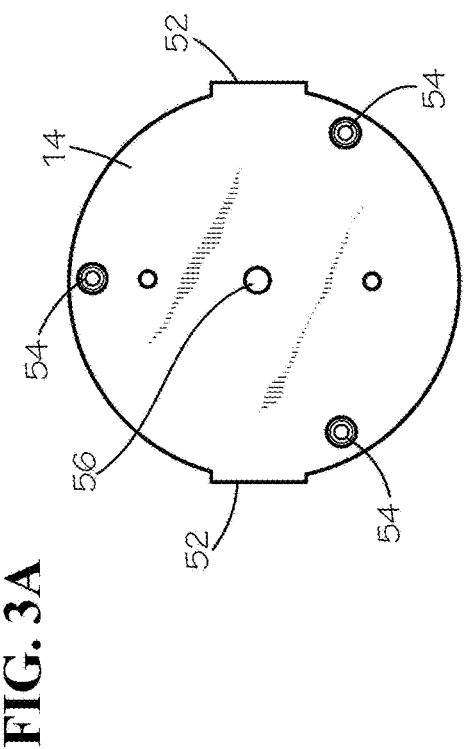
FIG. 4

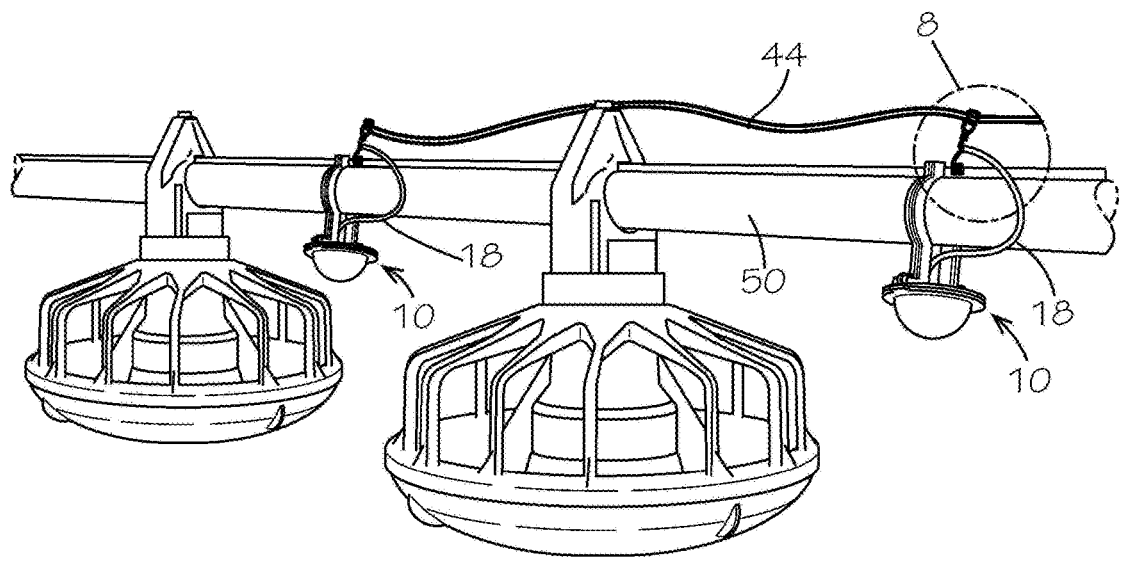
FIG. 7
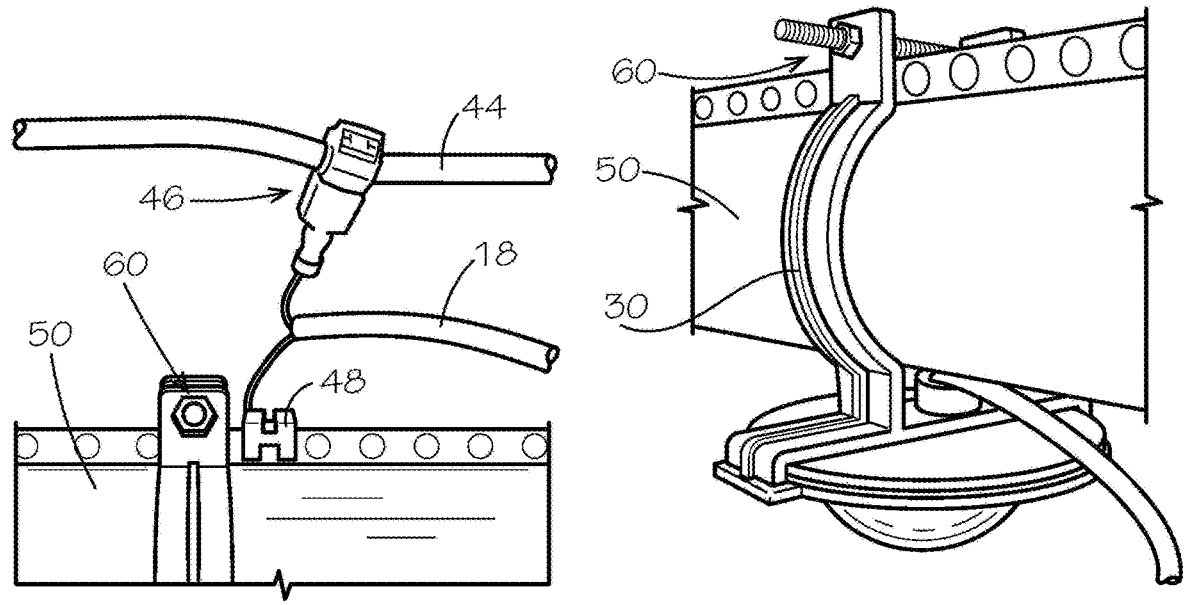
FIG. 8  FIG. 9

LIGHTING SYSTEM FOR ATTACHMENT TO TUBULAR STRUCTURE

RELATED APPLICATIONS

This application claims priority as a continuation-in-part to co-pending application number PCT/US22/30818, titled Lighting System for Attachment to Tubular Structure, filed May 25, 2022, which claims priority to U.S. application Ser. No. 17/329,474, filed May 25, 2021, titled Lighting System for Attachment to Tubular Structure, the full disclosures of which are incorporated herein by reference.

FIELD

This invention relates to the field of lighting. More particularly, this invention relates to light fixtures for use on a tubular structure, such as in a poultry feeder system.

BACKGROUND

As described in related U.S. Pat. No. 9,945,544, the entire disclosure of which is incorporated herein by reference, lighting continues to be a challenge in poultry houses. Dust, moisture, and chemical exposure can negatively affect the consistency of light and reduce the expected lifetime of lighting fixtures. It is well understood that light levels in poultry houses need to be consistently varied at different times during the day and throughout a chicken's life cycle to reduce stress levels, thereby controlling the chicken's attitude and appetite which enhances its growth.

LED lighting has been used recently in chicken houses to save energy and improve light conditions. However, when such lighting is used in conjunction with poultry feeder tube systems, the lights should be positioned to reduce shadows cast by the feed-conveying tubes and the feeding pans suspended therefrom.

What is needed, therefore, is an LED lighting system that can be attached to poultry feeding tube systems in a manner that minimizes the casting of shadows within the feeding area.

SUMMARY

The above and other needs are met by a light fixture configured to attach to an elongate tubular structure. In a preferred embodiment, the light fixture includes a substantially planar baseplate having a pair of opposing tabs extending outward from its opposite edges, and a baseplate aperture passing through a central portion of the baseplate. A printed circuit board is attached against a lower surface of the baseplate. Passing through a central portion of the printed circuit board is a printed circuit board aperture that is aligned with the baseplate aperture. An array of light emitting diodes are disposed on the printed circuit board. The light fixture includes a mounting bracket attached to the baseplate. The mounting bracket includes a strap disposed against the upper surface of the baseplate, and a pair of clips disposed at opposite ends of the strap. Each clip is engaged with a corresponding one of the tabs at the edges of the baseplate to secure the mounting bracket to the baseplate. A pair of clamp arms extend from the strap, each including an arcuate central portion having a curvature that substantially matches the curvature of the elongate tubular structure. Disposed between the pair of clamp arms is a strap aperture that passes through a central portion of the strap and is aligned with the baseplate aperture. A power cable passes through the strap aperture, the baseplate aperture, and the printed circuit board aperture. The power cable includes power wires that are electrically connected to the printed circuit board for providing power to the array of light emitting diodes. A protective cover protects the baseplate and the printed circuit board. At least a portion of the protective cover provides for transmission of light from the array of light emitting diodes.

In some embodiments, at least a portion of the protective cover is translucent to improve dispersal of light from the array of light emitting diodes.

In some embodiments, at least a portion of the protective cover is domed to improve dispersal of light from the array of light emitting diodes.

In some embodiments, the protective cover is molded from plastic.

In some embodiments, the protective cover includes a pair of opposing protective extensions that extend outward from opposing edges of the protective cover. Each of the protective extensions cover and protect a corresponding one of the clips of the mounting bracket.

In some embodiments, a raised channel is disposed around the strap aperture and extends from an upper surface of the strap. Means are disposed within the raised channel for sealing the baseplate aperture against water intrusion. The means disposed within the raised channel may be a sealant material or a compressible gasket or both.

In some embodiments, the baseplate includes an outer portion that extends beyond an outer edge of the printed circuit board, and a compressible gasket is disposed between the outer portion of the baseplate and the protective cover for preventing water intrusion into the printed circuit board.

In some embodiments, the strap, the pair of clips and the pair of clamp arms of the clamp are integrally formed from plastic.

In some embodiments, the elongate tubular structure is a component of a poultry feeding system.

In another aspect, an embodiment of the invention provides a lighting system that includes an elongate metal tubular structure, a long power cable, a power supply, and multiple light fixtures. The long power cable is disposed along the length of the elongate metal tubular structure. The power supply provides a first voltage to the long power cable and a second voltage to the elongate metal tubular structure. The light fixtures are attached to the elongate metal tubular structure. Each light fixture includes a baseplate, a printed circuit board attached to the baseplate, and an array of light emitting diodes disposed on the printed circuit board. Each light fixture also includes a mounting bracket having a strap that is secured to the baseplate, and a pair of clamp arms extending from the strap. Each clamp arm includes an arcuate central portion that wraps at least partially around the elongate metal tubular structure. A protective cover is attached to the baseplate that covers the printed circuit board. At least a portion of the protective cover provides for transmission of light from the array of light emitting diodes. Each light fixture has a short power cable that includes a first voltage wire and a second voltage wire that are electrically connected to the printed circuit board for providing power to the array of light emitting diodes. Each light fixture includes a first electrical connector that electrically connects the first voltage wire of the short power cable to the power wire of the long power cable, and a second electrical connector that electrically connects the second voltage wire of the short power cable to the elongate metal tubular structure.

In some embodiments, the elongate metal tubular structure is a component of a poultry feeding system.

In another aspect, an embodiment of the invention provides a light fixture configured to attach to an elongate tubular structure by means of a support bracket. In a preferred embodiment, the light fixture includes a substantially planar baseplate having a pair of opposing tabs extending outward from its opposite edges, and a baseplate aperture passing through a central portion of the baseplate. A printed circuit board is attached against a lower surface of the baseplate. Passing through a central portion of the printed circuit board is a printed circuit board aperture that is aligned with the baseplate aperture. An array of light emitting diodes are disposed on the printed circuit board. The light fixture includes a mounting bracket attached to the baseplate. The mounting bracket includes a strap disposed against the upper surface of the baseplate, and a pair of clips disposed at opposite ends of the strap. Each clip is engaged with a corresponding one of the tabs at the edges of the baseplate to secure the mounting bracket to the baseplate. A pair of clamp arms extend from the strap, each including an arcuate central portion having a curvature that substantially matches the curvature of the elongate tubular structure. Disposed between the pair of clamp arms is a strap aperture that passes through a central portion of the strap and is aligned with the baseplate aperture. The support bracket engages with and attaches the mounting bracket to the elongate tubular structure. A power cable passes through the strap aperture, the baseplate aperture, and the printed circuit board aperture. The power cable includes power wires that are electrically connected to the printed circuit board for providing power to the array of light emitting diodes. A protective cover protects the baseplate and the printed circuit board. At least a portion of the protective cover provides for transmission of light from the array of light emitting diodes.

In some embodiments, the support bracket comprises a unitary J-shaped structure having two arms forming a semicircular bend that defines a semicircular channel, with one arm longer than the other. A support beam extends perpendicularly from the longer of the two arms, and a tab extends from the shorter arm. The clamp arms of the mounting bracket include apertures that receive the support beam of the support bracket. The elongate tubular structure snaps into place within the semicircular channel of the support bracket, which is further secured by the tab extending from the shorter arm.

In some embodiments, the support beam of the support bracket and the apertures passing through the clamp arms may have rectangular or circular cross sections.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein:

FIGS. 1A, 1B and 1C depict a poultry feeder light fixture according to an embodiment of the invention;

FIG. 2 depicts an exploded view of the poultry feeder light fixture according to an embodiment of the invention;

FIGS. 3A and 3B depict a baseplate and printed circuit board of the poultry feeder light fixture according to an embodiment of the invention;

FIG. 4 depicts a baseplate of the poultry feeder light fixture according to an embodiment of the invention;

FIG. 7 depicts a string of poultry feeder light fixtures attached to a poultry feeding system according to an embodiment of the invention;

FIG. 8 depicts a detailed view of a portion of one of the poultry feeder light fixtures depicted in FIG. 7;

FIG. 9 depicts a poultry feeder light fixture attached to a feeding tube of a poultry feeding system according to an embodiment of the invention;

DETAILED DESCRIPTION

Figure 5A:
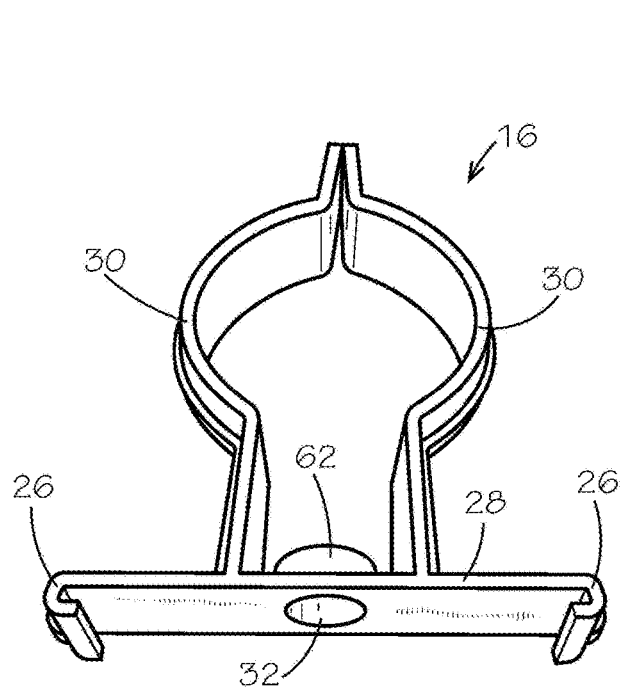
FIGS. 5A, 5B and 5C depict a mounting bracket of the poultry feeder light fixture according to an embodiment of the invention.
Figure 5B:
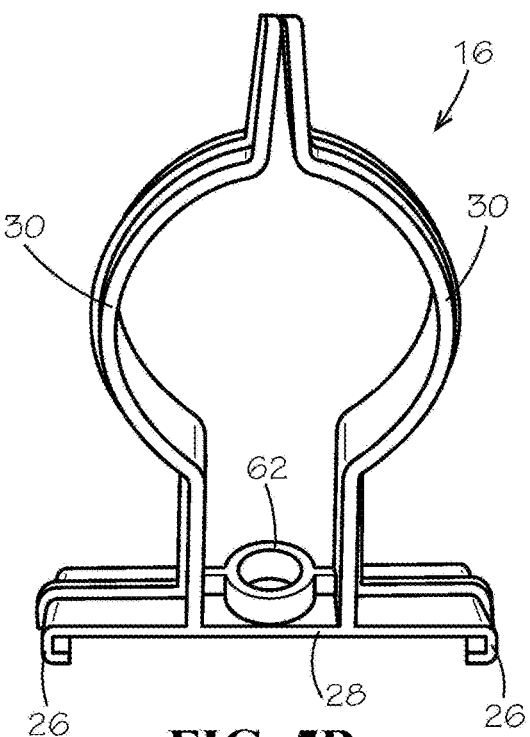
Figure 5C:
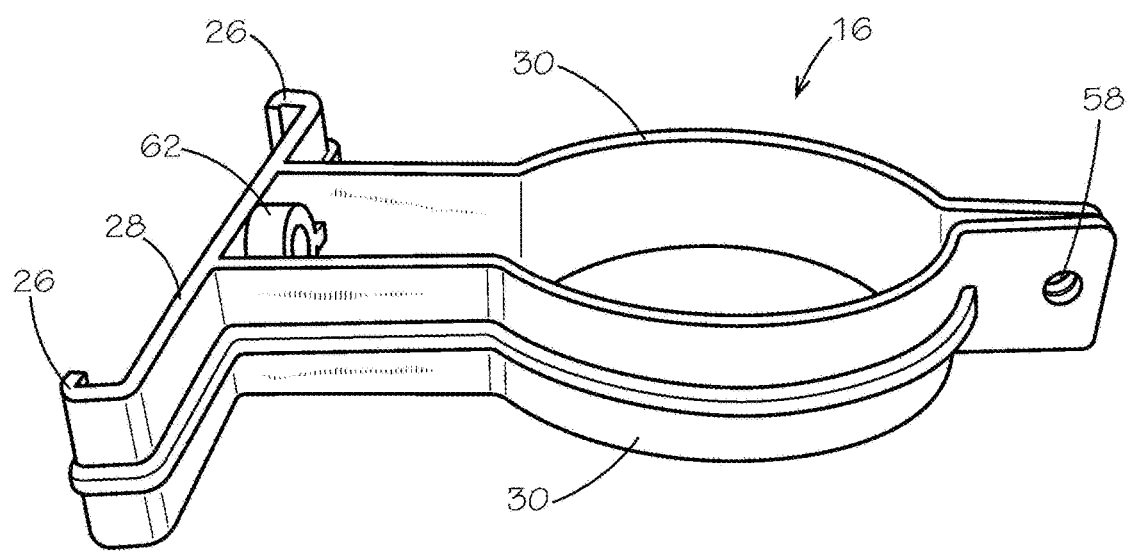

FIGS. 1A-1C and 2 depict a preferred embodiment of a poultry feeder light fixture 10. The fixture 10 includes a protective cover 12 and mounting bracket 16 attached to a metal baseplate 14, and a power cable 18 for providing electrical power to the fixture. As shown in FIGS. 3A and 3B, a printed circuit board (PCB) 20 is attached to the baseplate 14. Mounted on the PCB 20 are six light emitting diodes (LEDs) 24 arranged in a circle. It will be appreciated that more or fewer LEDs may be included in alternative embodiments. In a preferred embodiment, a driver-on-board (DOB) control circuit on the PCB 20 controls the operation of the LEDs 24.

While serving as a mounting structure, the baseplate 14 also dissipates heat away from the PCB 20, thereby extending the life of the LEDs 24. As shown in FIG. 4, a pair of tabs 52 are preferably disposed on opposing edges of the baseplate 14. The baseplate 14 includes threaded apertures 54 that receive screws for attaching the protective cover 12, and a central aperture 56 through which the power cable 18 passes.

As depicted in FIGS. 3A-3B and 5A-5C, the mounting bracket 16 includes a pair of clips 26 disposed at opposing ends of a strap 28. Each of the clips 26 engages one of the tabs 52 on the baseplate 14 to secure the mounting bracket 16 to the baseplate 14. The mounting bracket 16 also includes a pair of clamp arms 30 extending from the strap 28. Each clamp arm 30 has a curved portion that is shaped to generally match the outer contour of a feeding tube 50 of a poultry house feeding system, such as shown in FIG. 7. Disposed near the distal ends of the clamp arms 30 are opposing apertures 58 for receiving a bolt/nut assembly 60 that pulls the opposing clamp arms 30 tightly against either side of the feeding tube 50, as depicted in FIGS. 8 and 9.

Figure 11:
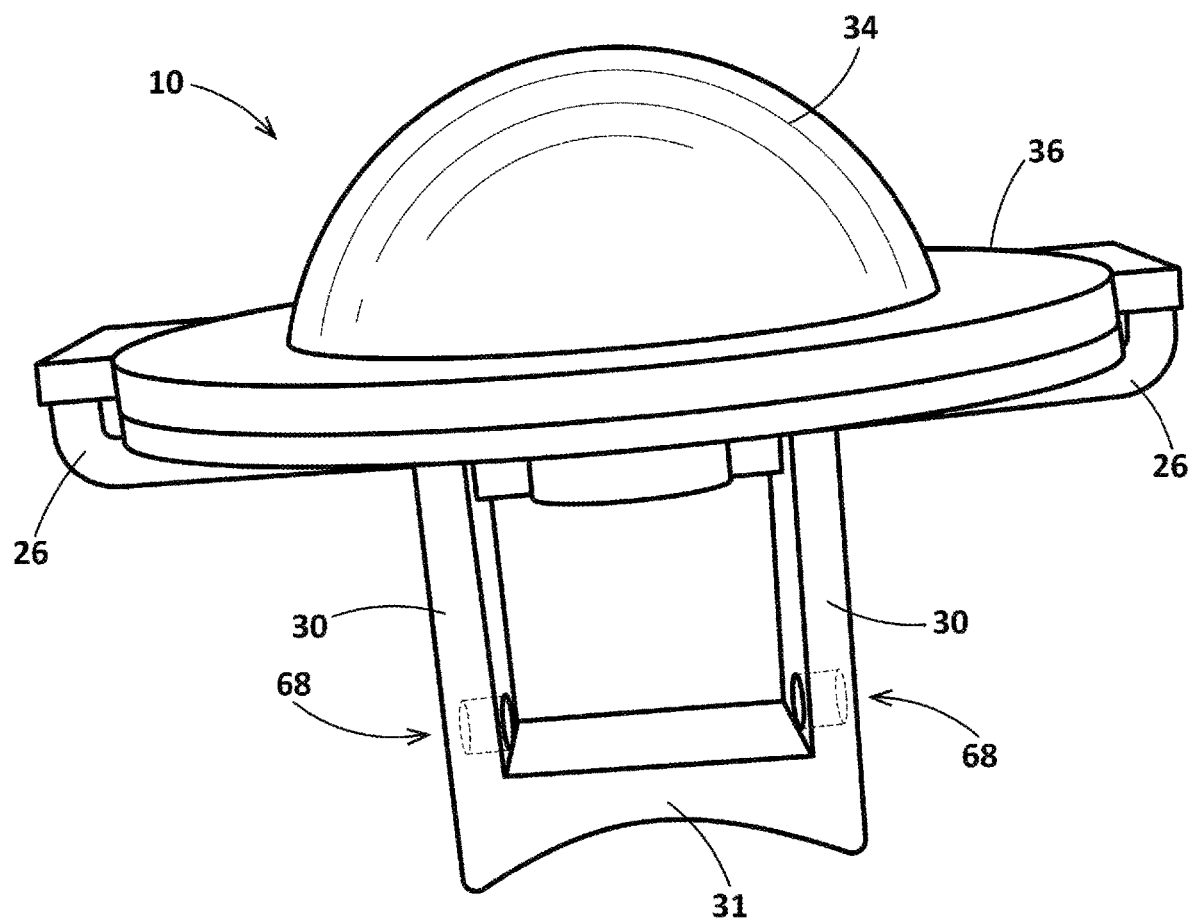
FIG. 11 depicts a poultry feeder light fixture according to a first alternative embodiment of the invention.

In an alternative embodiment depicted in FIG. 11, an arcuate portion 31 of the mounting bracket 16 that matches the outer contour of the feeding tube is disposed between the clamp arms 30 extending from the strap 28. In this embodiment, a zip-tie strap passes through a pair of apertures 68 in the clamp arms 30 and wraps around the feeding tube to secure the light fixture 10 to the feeding tube.

Figure 12A:
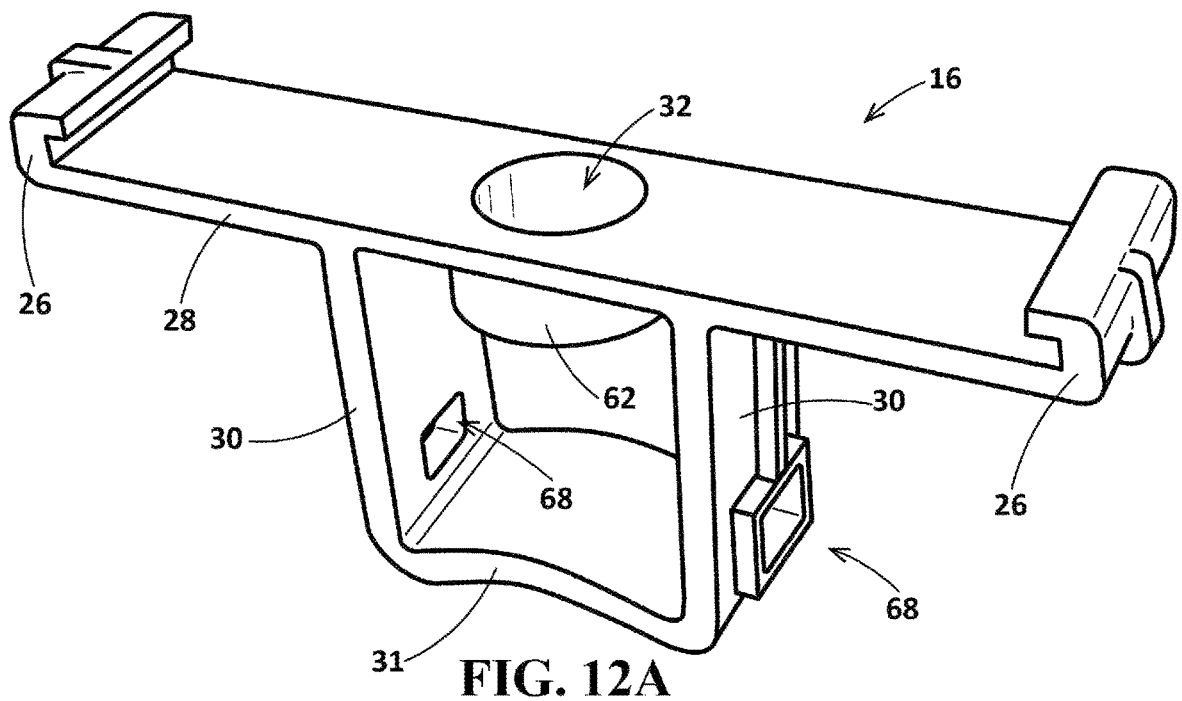
FIGS. 12A and 12B depict a mounting bracket of a poultry feeder light fixture according to the first alternative embodiment.
Figure 12B:
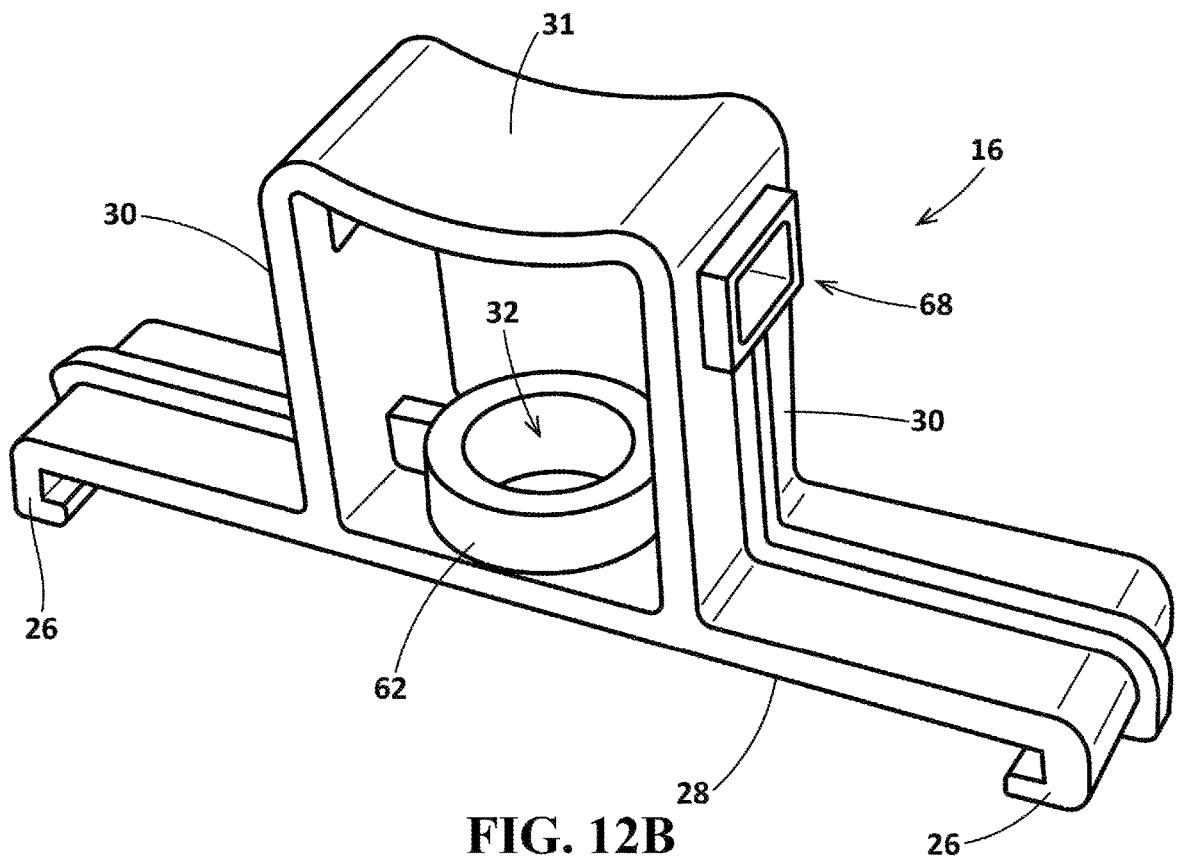

FIGS. 12A and 12B depict an alternative structure for the mounting bracket 16 of the embodiment depicted in FIG. 11.

The strap 28 includes an aperture 32 through which the power cable 18 passes to the PCB 20. Surrounding the strap aperture 32 is a raised cylindrical channel 62 that provides a reinforced structure to support the power cable 18 passing therethrough. As shown in FIG. 1C, the raised channel 62 also provides some surface area around the power cable 18 to accommodate a seal to prevent water intrusion into the PCB 20. In an exemplary embodiment, the raised channel 62 forms a reservoir to receive sealant 64, such as silicone calk, for sealing the strap aperture 32 and the baseplate aperture 56 beneath (shown in FIG. 4). Alternatively, a compressible gasket could fit between the raised channel 62 and the power cable 18 to seal against water intrusion.

Figure 6A:
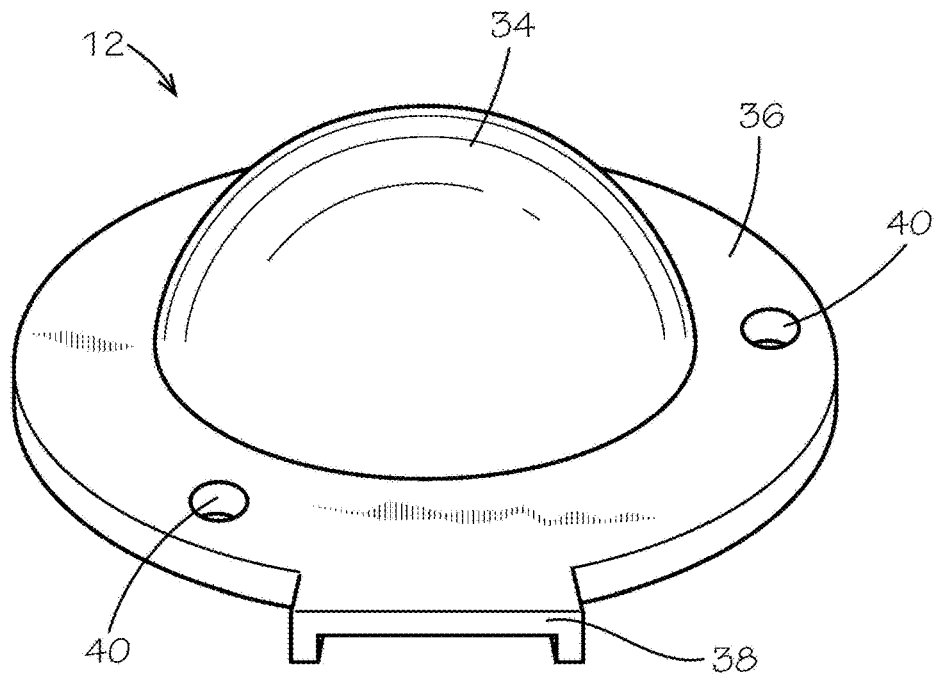
FIGS. 6A and 6B depict a protective cover of the poultry feeder light fixture according to an embodiment of the invention.
Figure 6B:
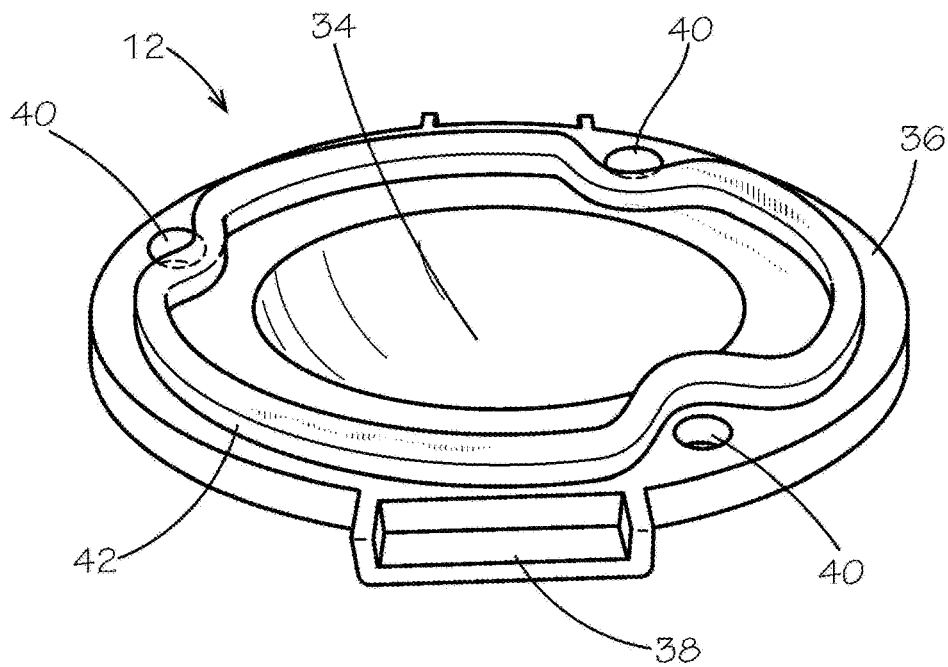

As shown in FIGS. 6A and 6B, a preferred embodiment of the protective cover 12 is preferably molded from clear or translucent plastic through which light from the LEDs may pass. The cover 12 includes a dome 34 disposed over the circular array of LEDs for improving the dispersal of light from the LEDs. A flange 36 covers the outer regions of the baseplate. In a preferred embodiment, protective extensions 38 extend outward from opposing edges of the flange 36. As shown in FIGS. 1A-1C, the extensions 38 cover and protect the clips 26 of the mounting bracket 16 and the tabs 52 of the baseplate 14. Apertures 40 are provided through the flange 36 through which screws pass to engage threaded holes 54 in the baseplate 14 to attach the cover 12 to the baseplate 14. A compressible gasket 42 provides a moisture barrier between the baseplate 14 and the flange 36 of the cover 12 to protect the PCB 20.

Figure 10:
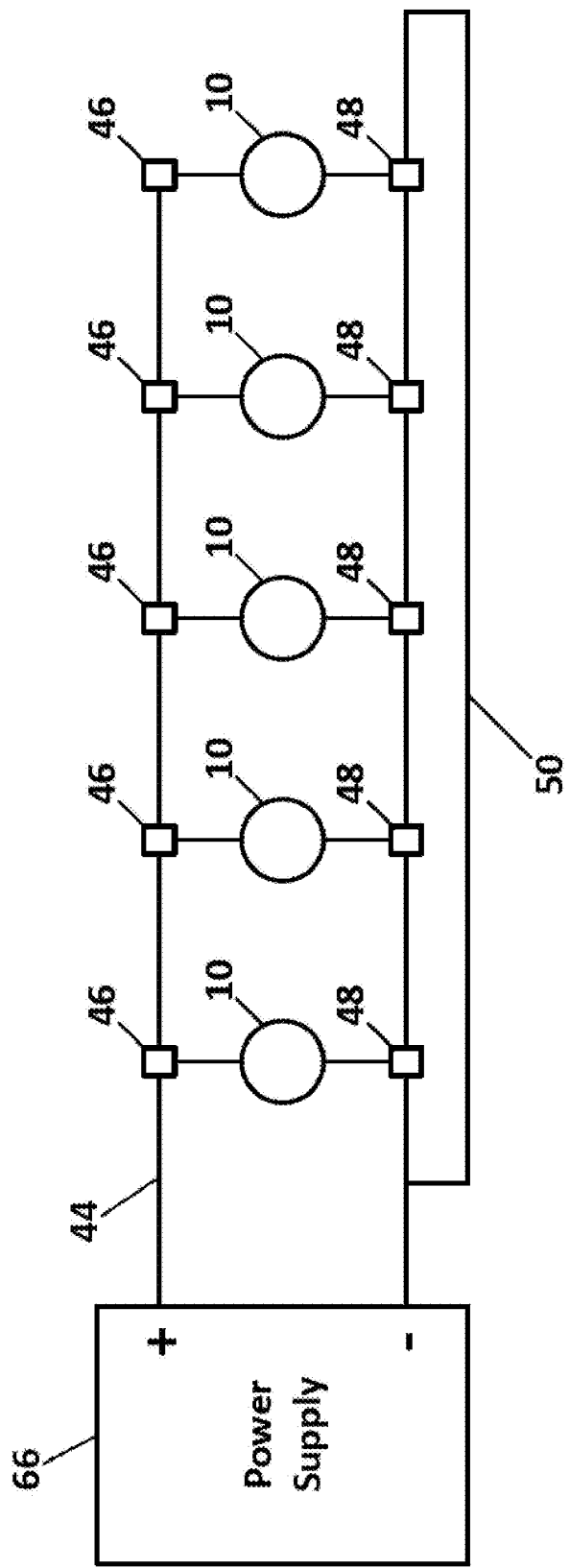
FIG. 10 depicts a schematic diagram of a poultry feeder lighting system according to an embodiment of the invention.

FIGS. 7, 8 and 10 depict a string of poultry feeder light fixtures 10 attached to a poultry feeding system. Using a clip-on connector 48, the negative voltage (or ground) wire of the power cable 18 of each fixture 10 is attached to the steel feeding tube 50 which is electrically connected to the negative terminal of a DC power supply 66. Using a crimp-on connector 46, the positive wire of the power cable 18 is attached to a power wire 44 that connects to the positive terminal of the DC power supply 66 and runs the length of the feeding tube 50. With this arrangement, the feeding tube 50 serves as the negative (or ground) conductor for the whole string of fixtures 10, thereby eliminating the need for a double conductor power cable running the full length of the string. Since only a single-conductor power wire 44 is needed for the string, wirings costs can be significantly reduced in large poultry house installations. In one preferred embodiment, the power supply 66 provides +48 VDC to the single-conductor power wire 44 and −48 VDC to the feeding tube 50 for powering the parallel-connected string of light fixtures 10.

Figure 13:
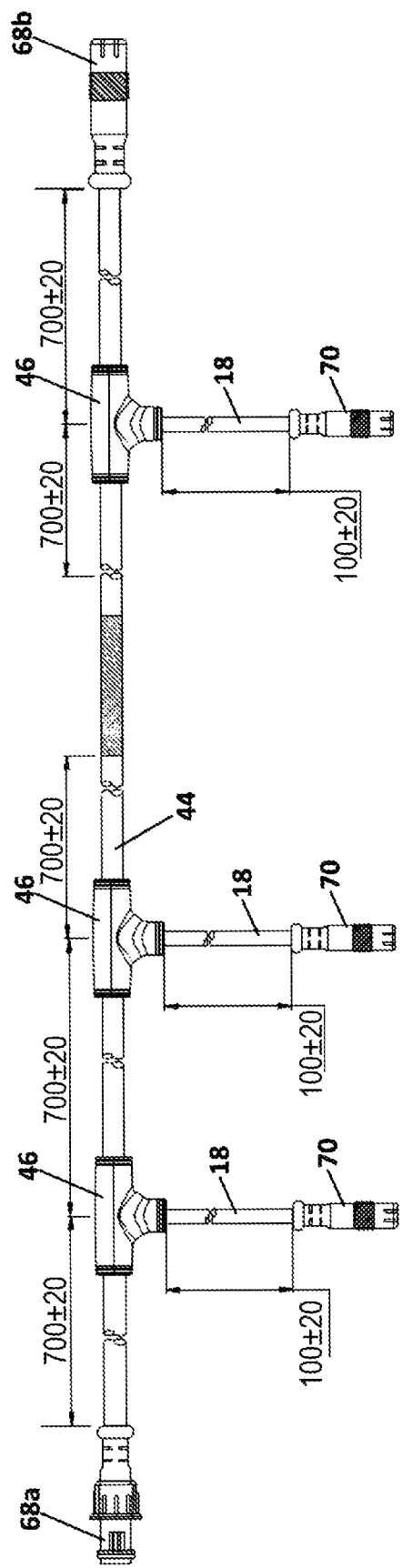
FIG. 13 depicts a power wiring configuration of a poultry feeder lighting system according to an alternative embodiment of the invention.

In some embodiments, the light fixtures 10 are electrically connected to the power supply 66 in a parallel configuration via a power harness as depicted in FIG. 13. In these embodiments, the connector 68a is connected to the power supply 66 and each of the connectors 70 is connected to one of the light fixtures 10. Optionally, multiple harnesses may be strung together by connecting the connector 68b of one harness to connector 68a of the adjacent harness. The connectors 68a, 68b and 70 are preferably waterproof to prevent moisture incursion. In this configuration, the negative power supply connection is provided by a wire in the harness, rather than by the metal feeding tube.

Figure 14A:
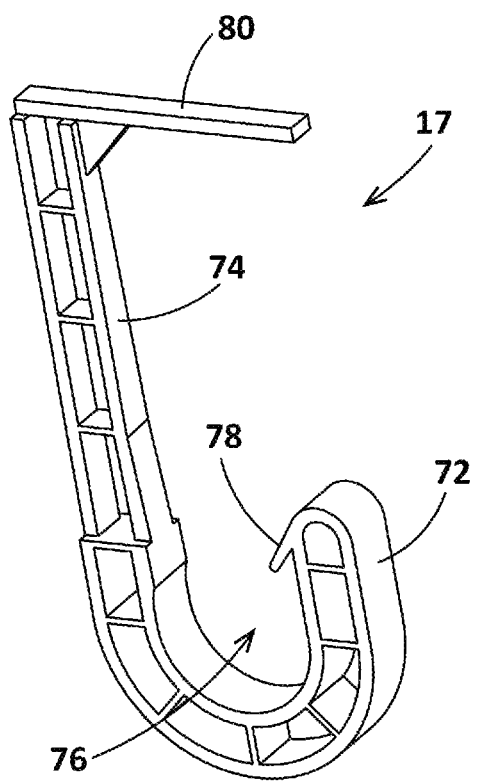
FIGS. 14A and 14B depict a support bracket of a poultry feeder light fixture according to an embodiment of the invention.
Figure 14B:
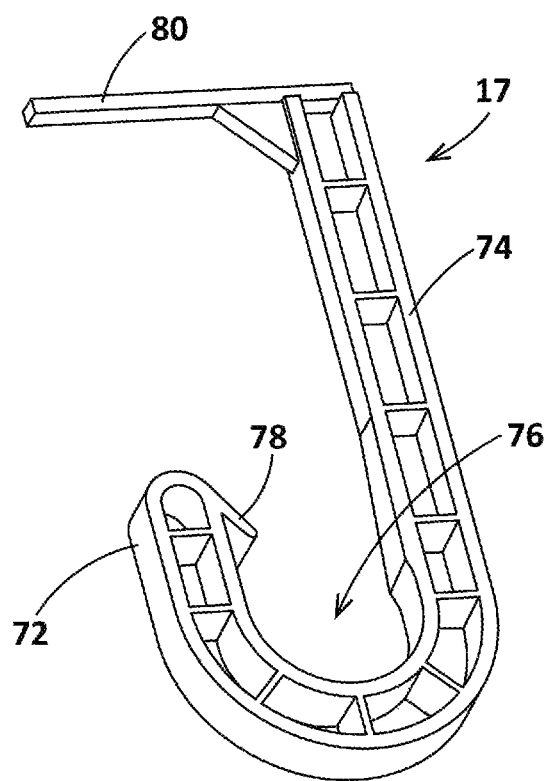

FIGS. 14A and 14B depict a support bracket 17 that provides for securing a light fixture to a feeding tube in an alternative configuration. The support bracket 17 includes a J-shaped structure having a short arm 72 and a long arm 74 that together form a semicircular channel 76 into which the feeding tube is received. Preferably, the inside diameter of the channel 76 is only slightly larger than the outer diameter of the feeding tube so that the feeding tube fits snugly in the channel 76. A tab 78, which extends outward from the inside surface of the short arm 72, is configured to flex inward somewhat to allow the feeding tube to be inserted into the channel 76 and then flex back outward to capture the feeding tube in a snap-fit configuration.

Figure 15A:
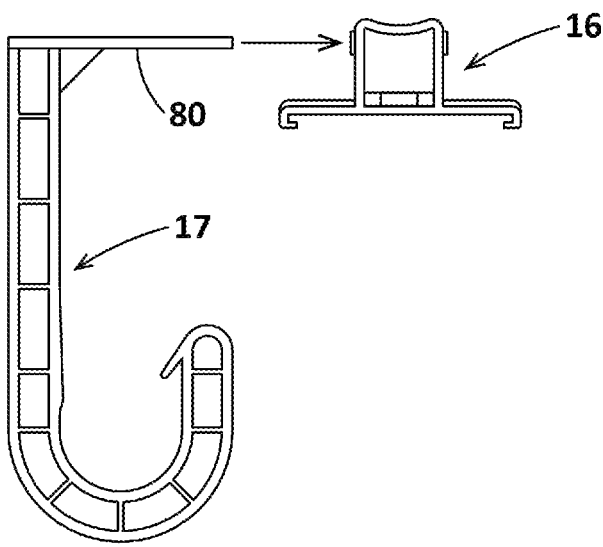
FIGS. 15A and 15B depict the mounting bracket of FIGS. 12A and 12B supported by the support bracket depicted in FIGS. 14A and 14B.
Figure 15B:
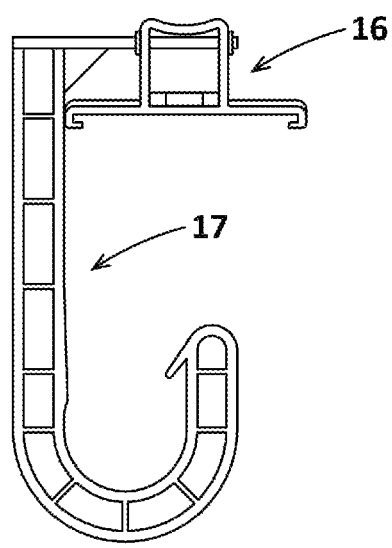

A support beam 80 extends from the upper end of the long arm 74. The profile of the lateral cross section of the support beam 80 is preferably rectangular and substantially matches but is somewhat smaller than the rectangular profile of the apertures 68 in the clamp arms 30 of the mounting bracket 16. As shown in FIGS. 15A and 15B, the support beam 80 is received within the apertures 68 to attach the mounting bracket 16 to the support bracket 17. This configuration provides for mounting the lighting fixtures 10 above the feeding tube. In an alternative embodiment, the support beam 80 has a circular cross section and the apertures 68 in the clamp arms 30 of the mounting bracket 16 are circular, which allows the light fixture to be rotationally tilted with respect to the support beam 80 to adjust the direction of illumination.

When such lighting is used in conjunction with poultry feeder tube systems, the lights should be positioned to reduce shadows cast by the feed-conveying tubes and the feeding pans suspended therefrom.

Those skilled in the art will appreciate that an LED lighting system attached to the underside of a poultry feeding tube system provides light of sufficient brightness to raise awareness of the feed lines for young poultry, while minimizing the casting of shadows within the feeding area.

While embodiments described herein are directed to the use of light fixtures attached to tubular structures of a poultry feeding system, those skilled in the art of lighting will appreciate that the light fixtures described herein are not limited to use only in poultry feeding and other agricultural applications but may be used in any application in which light fixtures are attached to pipes, conduits, and other tubular structures.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A light fixture configured to attach to an elongate tubular structure, the light fixture comprising:

a baseplate having an upper surface and a lower surface, the baseplate comprising:
  a pair of opposing tabs extending outward from opposite edges of the baseplate; and
  a baseplate aperture passing through a central portion of the baseplate;
a printed circuit board attached against the lower surface of the baseplate, the printed circuit board having a printed circuit board aperture passing through a central portion of the printed circuit board, wherein the printed circuit board aperture is aligned with the baseplate aperture;
an array of light emitting diodes disposed on the printed circuit board;
a mounting bracket attached to the upper surface of the baseplate, the mounting bracket comprising:
  a strap disposed adjacent the upper surface of the baseplate;
  a pair of clips disposed at opposite ends of the strap, each clip engaged with a corresponding one of the tabs at the edges of the baseplate to secure the mounting bracket to the baseplate;
  a pair of clamp arms extending from the strap;
  an arcuate central portion disposed between and connected to the clamp arms, the arcuate central portion having a curvature that substantially matches a curvature of the elongate tubular structure; and
  a strap aperture passing through a central portion of the strap, the strap aperture disposed between the pair of clamp arms and aligned with the baseplate aperture;
a power cable passing through the strap aperture, the baseplate aperture, and the printed circuit board aperture, the power cable including power wires electrically connected to the printed circuit board for providing power to the array of light emitting diodes; and
a protective cover that covers the baseplate and the printed circuit board, wherein at least a portion of the protective cover provides for transmission of light from the array of light emitting diodes.

2. The light fixture of claim 1 further comprising apertures passing through each of the clamp arms, each of the apertures disposed adjacent the arcuate central portion, the apertures for receiving a zip-tie strap that wraps around the arcuate central portion and around the elongate tubular structure to secure the light fixture to the elongate tubular structure.

3. The light fixture of claim 1 wherein at least a portion of the protective cover is translucent to improve dispersal of light from the array of light emitting diodes.

4. The light fixture of claim 1 wherein at least a portion of the protective cover is domed to improve dispersal of light from the array of light emitting diodes.

5. The light fixture of claim 1 wherein the protective cover is molded from plastic.

6. The light fixture of claim 1 wherein the protective cover includes a pair of opposing protective extensions that extend outward from opposing edges of the protective cover, wherein each of the protective extensions cover and protect a corresponding one of the clips of the mounting bracket.

7. The light fixture of claim 1 further comprising:
  a raised channel disposed around the strap aperture, the raised channel extending from an upper surface of the strap; and
  means disposed within the raised channel for sealing the baseplate aperture against water intrusion.

8. The light fixture of claim 7 wherein the means disposed within the raised channel for sealing the baseplate aperture against water intrusion comprise one or both of a sealant material and a compressible gasket.

9. The light fixture of claim 1 wherein the baseplate includes an outer portion that extends beyond an outer edge of the printed circuit board, and the light fixture further comprises a compressible gasket disposed between the outer portion of the baseplate and the protective cover for preventing water intrusion into the printed circuit board.

10. The light fixture of claim 1 wherein the strap, the pair of clips, the pair of clamp arms, and the arcuate central portion of the clamp are integrally formed from plastic.

11. The light fixture of claim 1 wherein the elongate tubular structure is a component of a poultry feeding system.

12. A lighting system comprising:
  an elongate tubular structure;
  a long power cable disposed along a length of the elongate tubular structure;
  a power supply for providing a voltage to the long power cable;
  a plurality of light fixtures attached to the elongate tubular structure, each comprising:
    a baseplate;
    a printed circuit board attached against a lower surface of the baseplate;
    an array of light emitting diodes disposed on the printed circuit board;
    a mounting bracket attached to an upper surface of the baseplate, the mounting bracket comprising:
      a strap secured to the upper surface of the baseplate; and
      a pair of clamp arms extending from the strap, the clamp arms engaged with an arcuate central portion that engages the elongate tubular structure;
    a protective cover attached to the baseplate that covers the printed circuit board, wherein at least a portion of the protective cover provides for transmission of light from the array of light emitting diodes;
    a short power cable electrically connected to the printed circuit board for providing power to the array of light emitting diodes; and
    an electrical connector for electrically connecting the short power cable to the long power cable.

13. The lighting system of claim 12 wherein the elongate tubular structure is a component of a poultry feeding system.

14. A light fixture configured to attach to an elongate tubular structure, the light fixture comprising:
  a baseplate having an upper surface and a lower surface, the baseplate comprising:
    a pair of opposing tabs extending outward from opposite edges of the baseplate; and
    a baseplate aperture passing through a central portion of the baseplate;
  a printed circuit board attached against the lower surface of the baseplate, the printed circuit board having a printed circuit board aperture passing through a central portion of the printed circuit board, wherein the printed circuit board aperture is aligned with the baseplate aperture;
  an array of light emitting diodes disposed on the printed circuit board;
  a mounting bracket attached to the upper surface of the baseplate, the mounting bracket comprising:
    a strap disposed adjacent the upper surface of the baseplate;
    a pair of clips disposed at opposite ends of the strap, each clip engaged with a corresponding one of the tabs at the edges of the baseplate to secure the mounting bracket to the baseplate;
a pair of clamp arms extending from the strap;
an arcuate central portion disposed between and connected to the clamp arms; and
a strap aperture passing through a central portion of the strap, the strap aperture disposed between the pair of clamp arms and aligned with the baseplate aperture;
a support bracket that engages with and attaches the mounting bracket to the elongate tubular structure;
a power cable passing through the strap aperture, the baseplate aperture, and the printed circuit board aperture, the power cable including power wires electrically connected to the printed circuit board for providing power to the array of light emitting diodes; and
a protective cover that covers the baseplate and the printed circuit board, wherein at least a portion of the protective cover provides for transmission of light from the array of light emitting diodes.

15. The light fixture of claim 14 wherein the support bracket comprises:
a unitary J-shaped structure with a first arm and a second arm that are joined together by a semicircular bend that forms a semicircular channel between the first and second arms, wherein the first arm is longer than the second arm;
a support beam extending perpendicularly from the first arm; and
a tab extending from the second arm.

16. The light fixture of claim 15 further comprising apertures passing through each of the clamp arms, each of the apertures disposed adjacent the arcuate central portion, the apertures sized and configured to receive the support beam of the support bracket.

17. The light fixture of claim 15 wherein an inside diameter of the semicircular channel is only slightly larger than an outer diameter of the elongate tubular structure so that the elongate tubular structure fits snugly into the semicircular channel of the support bracket, and the elongate tubular structure is retained by the tab extending from the second arm of the support bracket.

18. The light fixture of claim 16 wherein the support beam and the apertures in the clamp arms have rectangular cross sections.

19. The light fixture of claim 16 wherein the support beam and the apertures in the clamp arms have circular cross sections.

20. The lighting system of claim 14 wherein the elongate tubular structure is a component of a poultry feeding system.

* * * * *